3,552,081
METHOD AND APPARATUS FOR PACKAGING WITH A MOVABLE MANDREL AND MOVABLE SEALING JAWS

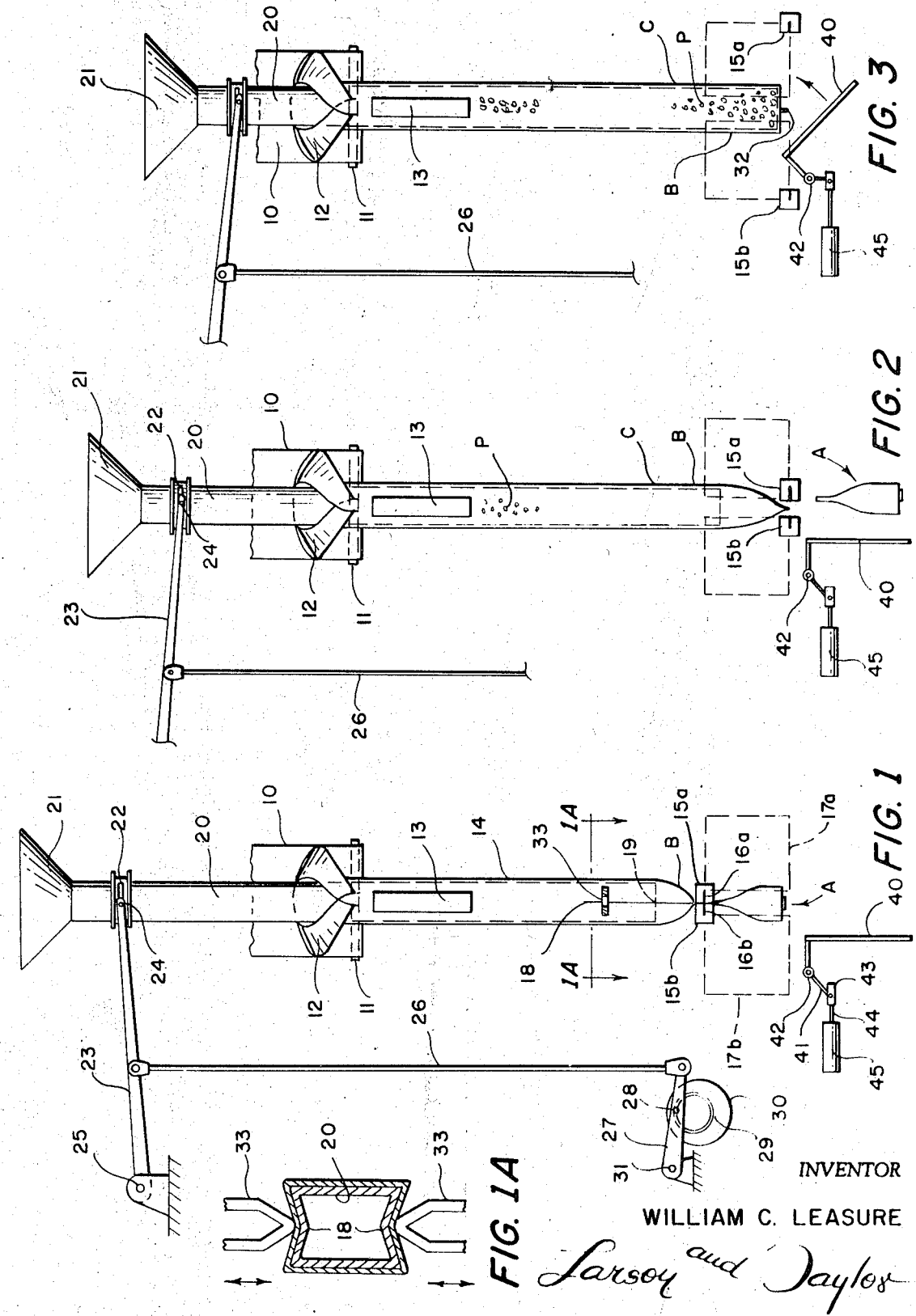

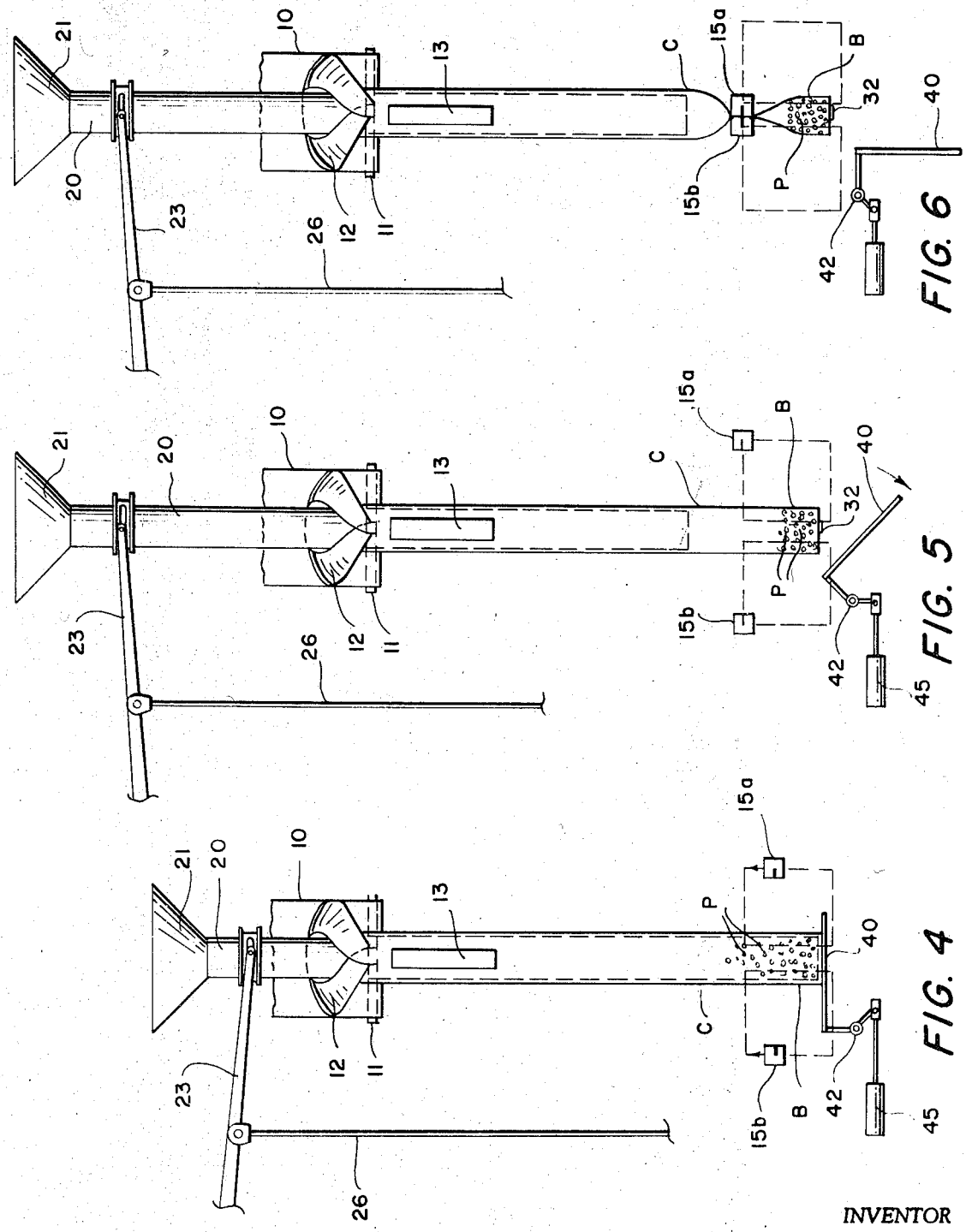

William C. Leasure, Houston, Tex., assignor to Mira-Pak Inc., Houston, Tex.
Continuation-in-part of application Ser. No. 691,762, Dec. 19, 1967. This application June 24, 1968, Ser. No. 739,348

Int. Cl. B65b 51/30

U.S. Cl. 53—28                    12 Claims

ABSTRACT OF THE DISCLOSURE

A method and an apparatus for packaging including reciprocating sealing jaws and a mandrel movable within a tubular length of material for assisting in flattening the end of the tubular length of material remote from the former.

CROSS-REFERENCE TO RELATED APPLICATIONS

This application is a continuation-in-part of my copending application Ser. No. 691,762, filed Dec. 19, 1967.

BACKGROUND—FIELD OF THE INVENTION

This invention relates to packaging and in particular it relates to a method and apparatus employing a movable mandrel in the production of a package on form, fill and seal type packaging machinery.

BACKGROUND—DESCRIPTION OF THE PRIOR ART

In the formation of a length of tubular material from a continuous web of material it is known to advance the material over the former by holding the former stationary and moving the sealing means. Such an arrangement is shown, for example, in the Zwoyer Pat. No. 1,986,422. However, heretofore this procedure has been utilized in the production of a "pillow" type package having transverse seals across the top and bottom of the package. At least one disadvantage of this type of package is its inability to stand upright.

SUMMARY OF THE INVENTION

The purpose of the present invention is to provide a new procedure concerning a packaging method and apparatus including reciprocating sealing jaws and a mandrel, movable within a tubular length of packaging material, for assisting in forming a flat bottom on the package.

According to the present invention there is provided a mandrel having a rectangular cross-sectional area of the proper geometry to form a flat bottom bag with or without gussets from the tubular length of material. Preferably, the mandrel extends from a point above the former, through the former to a point substantially below the former. Suitable means are provided for reciprocating the mandrel relative to the former. This hollow mandel is especially useful for filling the package with solid particles granular, fine powder or liquid product.

In my copending application Ser. No. 691,762 I disclose and claim the use of a movable mandrel generally, for assisting in the formation of a flat bottom on a length of tubular material, and in particular, for use with stationary sealing jaws in the formation of the flat bottom. The disclosure of said copending application is specifically incorporated by reference herein for such disclosure. The present application is concerned primarily with the use of a movable mandrel together with vertically reciprocating sealing jaws in the formation of a flat bottom on a length of tubular material as generally disclosed in the aforesaid copending application.

A feature of the present invention includes the use of the movable mandrel to assist in forming a flat bottom on the package. For this purpose the mandrel is moved downwardly relative to the former while the length of tubular material is stationary and after the sealing jaws have formed a bottom transverse seal and separated. The bottom of the mandrel engages the bottom of the tubular length of material and urges the same outwardly thereby forming a flat bottom, this flat bottom taking the shape of the cross-section of the mandrel. However, to complete the formation of the flat bottom it is necessary to fold upwardly the lower transverse seal. For this purpose the present invention includes a suitable means for bringing a flat surface against the bottom of the mandrel so that the closed bottom end of the tubular material is pressed between the lower end of the mandrel and the flat surface whereby the said lower transverse seal is folded upwardly and shaped to complete the flat bottom. The mandrel is then raised, the package is filled, and the jaws, which moved upwardly while the flat bottom was being formed, now move in against the tubular length of material to form the upper seal and to sever the finished filled package.

The filling of the flat bottom package may occur at any time after the package bottom has been formed.

Thus, it is an object of this invention to provide a new and improved method and apparatus for packaging.

It is another object of this invention to provide a new and improved method and apparatus for forming a flat bottom on a package formed on a form, fill and seal packaging machine.

It is still another object of this invention to provide a movable mandrel for assisting in the formation of a flat bottom package on a form, fill and seal packaging machine of the type having moving sealing jaws.

Other objects and the attendant advantages of the present invention will become apparent from the detailed description to follow together with the accompanying drawings.

BRIEF DESCRIPTION OF THE DRAWINGS

There follows a detailed description of the preferred embodiments of the present invention together with the accompanying drawings. However, it is to be understood that the invention is capable of numerous modifications and variations apparent to those skilled in the art without departing from the spirit and scope of the invention.

In the drawings:

FIGS. 1 through 6, inclusive, are diagrammatic drawings showing the sequence of operation of the present invention in connection with the formation of a package and the packaging of a product.

FIG. 1A is a sectional view taken along line 1A—1A of FIG. 1.

DETAILED DESCRIPTION OF THE PREFERRED EMBODIMENTS

In the accompanying drawings like numerals are employed to designate like parts throughout.

Referring to FIG. 1, a flat, continuous web of packaging material 10 passes over a guide roll 11 and hence over a former 12 where a sealing member 13 connects the opposite edges of the web to form a longitudinal seal and forms the web into a continuous tubular length of packaging material 14. The former 12 may be of the type shown in FIGS. 13 and 14 of the Leasure Pat. No. 2,969,627.

A pair of sealing jaws 15a and 15b are provided for forming a transverse seal across the tubular length 14 and pulling the material over the former. These sealing jaws further include a cooperating knife and slot means 16a and 16b of a construction well known in the art, for severing a completed package after the seal has been formed. These sealings jaws are movable along paths 17a and 17b, respectively, as shown in dotted lines. The jaws come together at an upper level to form a transverse seal, move downwardly, while still engaged, to pull additional material over the stationary former 12 to form an additional length of tubular material. The jaws then separate to release a severed completed package and rise to the said upper level to commence a new cycle.

The apparatus further includes a hollow mandrel 20 having an upper end with a funnel 21 formed thereon for receiving a product and a lower end 19. The upper end of portion 19 of the mandrel adjacent the funnel 21 and extending through the former is of a shape so that it passes through the former with clearance so that the former does not interfere with the reciprocatory movement of the mandrel. The end portion 19 of the mandrel is generally rectangular and of a shape to give the package the desired configuration. The sides of the end portion 19 could include a pair of V-shaped indentations to form gussets in the tubular shaped packaging film.

The mandrel cross-section may be of shapes dependent upon the desired configuration of the finished package. The peripheral distance around the mandrel is the same as the width of the packaging film less the width of film used in making the longitudinal seal. For example, if one desired a round flat bottom, then one would employ a round mandrel. However, in a preferred embodiment of the invention the mandrel will have a generally rectangular cross-section with two opposing sides having slightly indented V-shaped grooves for cooperating with gusseting bars 33 in a manner to be described in greater detail below, for forming a gussetted package.

For providing vertical reciprocation of the mandrel there is provided a collar 22 fixed to the mandrel and connected to a connecting rod 23 by a pin and slot connection 24, the rod 23 being connected to stationary pivot 25. Connecting link 26 is pivotally connected at one of its ends to the rod 23 and at its other end to a lever 27 which is in turn pivotally connected to stationary pivot 31. This lever 27 includes a cam follower 28 affixed thereto, which follower is received in an eccentric groove 29 in a cam plate 40 thereby causing rotating movement of the cam plate 30. Thus rotating movement of the cam plate 30 causes reciprocating movement of the mandrel 20.

At the lower end of the apparatus there is provided an L-shaped platen 40 including a connecting rod 41 rigidly connected thereto, the combination of platen 40 and connecting rod 41 being mounted for pivotal movement about stationary pivot 42. Connecting rod 41 is in turn pivotally connected at 43 to a piston rod 44 which is in turn connected to a double acting piston in the cylinder 45. Thus, by moving the piston to the right or left the platen 40 can be raised or lowered respectively.

The operation of the invention is as follows. In FIG. 1 jaws 15a and 15b have moved towards each other along the upper parts of paths 17a and 17b to form a transverse seal which is the upper seal of package A and the lower seal of package B. The jaws 15a and 15b now move downwardly to the position shown in FIG. 2, pulling the length of tubular material with it and thereby pulling an additional length of material over the former 12. The mandrel 20 could move downwardly as the jaws move downwardly; for example to the position shown in FIG. 2. Knife and slot means 16a and 16b then sever package A from the bottom of the next package, i.e. package B and the jaws start to separate. Next, as the jaws 15a and 15b continue to separate the mandrel 20 continues its downward movement until its lower end 19 engages the end of the tubular material 14 remote from the former 12 to flatten the bottom of the tubular length 14 as shown in FIG. 3. As shown in the drawings, product P may be introduced into the package at such time that it reaches the bottom of the length of tubular material as soon as this lower-end has been flattened.

Although the lower end 19 of the mandrel 20 has effectively flattened the lower end of the length of material 14, in order to shape the bottom, the lower transverse seal 32 at the very bottom of the tubular length 14 should be flattened against the package bottom. For this purpose, the piston in cylinder 45 is moved to the right thereby raising the platen 40, as shown in FIGS. 3 and 4 to meet the bottom of tubular length 14. If desired, suitable means may be provided for applying an adhesive to the lower transverse seal 32 before the platen 40 reaches it so that engagement with the platen 40 will cause the transverse seal 32 to fold upwardly and be held firmly against the flat bottom of the tubular length 14 thereby forming the flat bottom of package B. For certain types of packaging material it may be desirable to provide a heated platen to utilize the heat sealable coating of the packaging material.

The mandrel is then moved upwardly as shown in FIG. 5. Finally the seals 15a and 15b which were moving upwardly as the flat bottom was being formed are now moved inwardly to form the transverse seal which forms the top of package B and the bottom of package C. See FIGS. 5 and 6. Of course if desired, the sealing jaws may move above the upper part of paths 17a and 17b, and then inwardly at the higher level, and then downwardly to the position shown in FIG. 6 whereat the seal is to be formed. The purpose of this is to strip the seal area clean of product before forming the seal, this stripping operation being more fully described in my prior Pat. 3,027,695. The piston in cylinder 45 is now moved to the left, lowering the platen 40, thereby attaining the position shown in FIG. 1 after which the cycle is repeated.

The method and apparatus of the present invention may be employed in the production of either a pillow type package or a gussetted type package. In the production of a pillow type package the two ends of the lower seal would project laterally after the said lower seal has been folded up to the package. Suitable means (not shown) may be employed for folding these ends up to and attaching them against the sides of the package. Alternatively, means (not shown) may be employed for folding these ends under the package before the package engages the flat plate 40.

To form a gussetted type package gusseting bars 33 would engage the packaging film on the outer surface with the mandrel on the inner surface to urge the sides of the tubular length 14 into grooves 18 in the mandrel. If desired, rollers or other suitable means may be applied to the outer surface of the packaging film at the corners of the mandrel to crease the film more precisely and give the package a more tailored appearance. Sealing jaws 15a and 15b then form the transverse seal closing the package and permanently forming the gussets with the longitudinal seal formed therein. One advantage of this arrangement is that the longitudinal seal is on the side of the package, leaving the front and back free for the advertising message. The arrangement of the grooves 18 and the gusset bars 33 are shown in greater detail in FIG. 1A.

The arrangement shown in the figures may also be varied by changing the circumferential orientation of the former and/or the sealing jaws. For example, when forming a gussetted package with the longitudinal seal in the gusset, the sealing jaws 15a and 15b must be used in the positions shown to form the gussets. However, the former 12 and the longitudinal sealing means 13 could be turned 90° to place the longitudinal seal on the front or back of the package rather than in the gusset. Further, when producing a pillow type package with a mandrel which does not include the grooves 18, the sealing jaws may be employed in the positions shown to place the longitudinal seal on the side, or the sealing jaws may be turned 90° about the axis of the tubular length 14, to place the longitudinal seal on the front or back of the package.

Although preferred embodiments of the invention have been illustrated and described in considerable detail, it should be understood that the invention is capable of

I claim:

1. A method of packaging in which a former is adapted to shape a continuous web of material into a substantially tubular length of material comprising the steps of: forming an end seal across the tubular length of material by engaging the tubular length of material with sealing means, forming an additional length of tubular material by moving the sealing means away from the former while the sealing means still engages the said end seal, separating the sealing means from the tubular length of material, and subsequently flattening the end of the tubular length of material remote from the former immediately after said separating step by moving against the inside of the said end a mandrel a cross-sectional area slightly less than that of the tubular length of material.

2. The method of claim 1 wherein the step of flattening the remote end of the material includes pressing the said remote end against a flat platen.

3. The method of claim 1 wherein the sealing means comprises a pair of sealing jaws movable through a cycle into engagement with the tubular length of material, linearly with the tubular length of material, away from the tubular length of material, and upwardly for commencing a new cycle, and wherein said engaging, moving, and separating steps include moving the sealing jaws through said cycle into engagement with the tubular length of material, vertically with the tubular length of material, and away from the tubular length of material.

4. The method of claim 1 wherein the said flattening step includes moving a flat platen against the outside of the bottom of said tubular length of material immediately after the mandrel is moved against the inside of said end, thereby pressing the said bottom between the lower end of the mandrel and the flat platen.

5. The method of claim 4 wherein the step of flattening the remote end of the tubular length of material further includes attaching the last formed seal to the bottom of the tubular length of material formed by operation of the mandrel against the said remote end while the material is being pressed between the said end of the mandrel and the platen.

6. The method of claim 1 wherein the mandrel is a hollow tube passing through the former, and having an outer cross-sectional area slightly less than the cross-sectional area of the tubular length of material, and wherein the step of moving the mandrel is accomplished by means engaging the mandrel at a point on the side of the former opposite from said end of the mandrel.

7. The method of claim 6 wherein the step of flattening the remote end of the tubular length of material includes pressing the said remote end between the mandrel and a flat platen surface.

8. A packaging apparatus including a former means for forming a continuous web of sheet material into a length of tubular material, sealing means for engaging the tubular length of material to form package closing end seals across an end of the tubular length of material remote from the former and to advance the web over the former to form an additional length of tubular material, the improvement comprising a flattening means for flattening the said remote end of the tubular length of material in the vicinity of the said end seals immediately after the said sealing means has advanced the material over the former.

9. The apparatus of claim 8 wherein said flattening means comprises a mandrel mounted for movement through the former means and through the interior of the tubular length of material against the inside remote end.

10. The apparatus of claim 9 wherein said mandrel is a hollow tube, the said end of which has a cross-sectional area slightly less than the cross-sectional area of the tubular length of material.

11. The apparatus of claim 10 including a platen having a flat surface movable into the path of movement of the mandrel so that the said end of the mandrel can press the said remote end of the tubular length of material against the said platen.

12. The apparatus of claim 9 including means engaging the mandrel at a point on the side of the former away from the said tubular length of material for moving the mandrel.

References Cited

UNITED STATES PATENTS

| | | | |
|---|---|---|---|
| 3,086,335 | 4/1963 | Frank | 53—180 |
| 3,048,951 | 8/1962 | Oler | 53—28 |
| 3,263,391 | 8/1966 | Wallsten | 53—28 |

THERON E. CONDON, Primary Examiner

E. F. DESMOND, Assistant Examiner

U.S. Cl. X.R.

53—182